United States Patent
Cheng et al.

(10) Patent No.: US 8,111,529 B2
(45) Date of Patent: Feb. 7, 2012

(54) OVER CURRENT PROTECTION CIRCUIT AND POWER CONVERTER USING THE SAME

(75) Inventors: Lan-Shan Cheng, Hsinchu (TW); Chih-Yuan Hsieh, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 528 days.

(21) Appl. No.: 12/394,449

(22) Filed: Feb. 27, 2009

(65) Prior Publication Data

US 2010/0117618 A1 May 13, 2010

(30) Foreign Application Priority Data

Nov. 7, 2008 (TW) .............................. 97143206 A

(51) Int. Cl.
*H02M 7/10* (2006.01)
*G05F 1/10* (2006.01)

(52) U.S. Cl. ........... 363/49; 323/238; 323/285; 323/901

(58) Field of Classification Search ............... 363/49; 323/238, 276, 277, 282–285, 321, 901, 908; 361/18, 93.1, 93.9
See application file for complete search history.

(56) References Cited

U.S. PATENT DOCUMENTS

| | | | | |
|---|---|---|---|---|
| 5,610,503 A | * | 3/1997 | Fogg et al. | 323/283 |
| 7,235,962 B2 | * | 6/2007 | Mazda | 324/96 |
| 8,018,694 B1 | * | 9/2011 | Wu | 361/18 |

* cited by examiner

*Primary Examiner* — Jessica Han
(74) *Attorney, Agent, or Firm* — Rabin & Berdo, P.C.

(57) ABSTRACT

An over current protection circuit and a power converter using the same. The over current protection circuit includes a soft start cell and an operational amplifier. The soft start cell outputs a soft start signal according to a direct current (DC) level, and the soft start signal increases progressively to the DC level in a soft start interval. The operational amplifier outputs an over current signal to a feedback control circuit according to the soft start signal and an inductance current of a switching converter so that a duty cycle of a driving signal from the feedback control circuit increases progressively in the soft start interval.

16 Claims, 5 Drawing Sheets

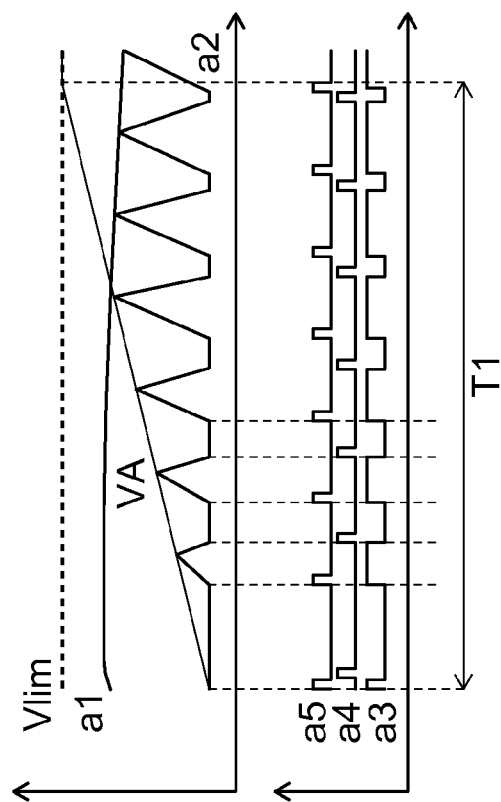
FIG. 5
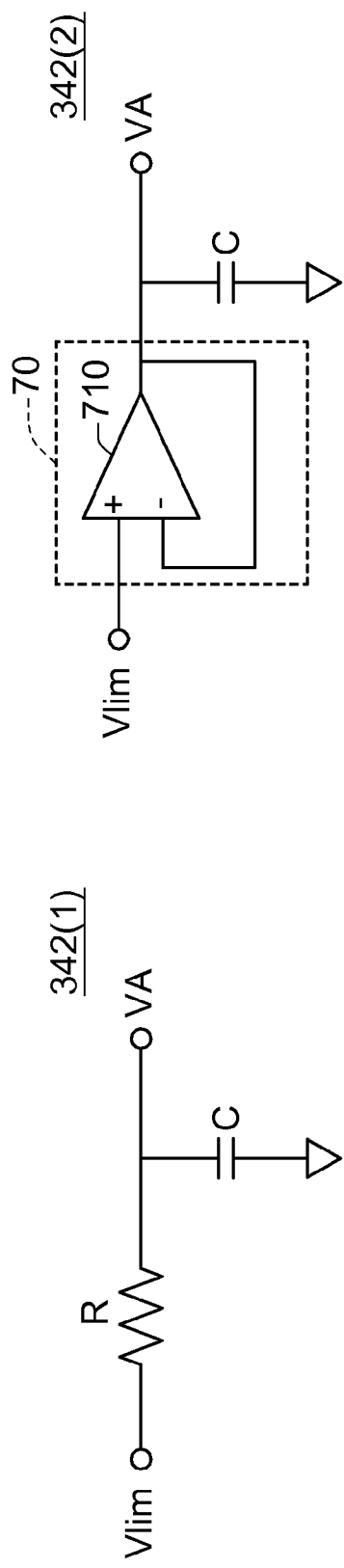
FIG. 7
FIG. 6

OVER CURRENT PROTECTION CIRCUIT AND POWER CONVERTER USING THE SAME

This application claims the benefit of Taiwan application Serial No. 97143206, filed Nov. 7, 2008, the subject matter of which is incorporated herein by reference.

BACKGROUND OF THE INVENTION

1. Field of the Invention

The invention relates in general to an over current protection circuit and a power converter using the same, and more particularly to an over current protection circuit with a soft start function and a power converter using the same.

2. Description of the Related Art

FIG. 1 (Prior Art) is a schematic illustration showing a first conventional power converter 10(1). Referring to FIG. 1, the conventional power converter 10(1) for providing power Vo to a load 20 includes a switching converter 110, a current sensing circuit 130, an operational amplifier 144, a conventional soft start circuit 142(1), a load sensing circuit 1212, an error amplifier 1214, a compensator 1216, an operational amplifier 1222, a logic gate 1224, a clock generator 1226, a latch 1228 and a buffer amplifier 1229.

The current sensing circuit 130 senses an inductance current of the switching converter 110 to output a current sensing signal a2. The operational amplifier 144 outputs an over current signal a6 according to the current sensing signal a2 and a direct current (DC) level Vlim. The load sensing circuit 1212 senses a current of the load 20, and outputs a feedback signal a1 via the error amplifier 1214 and the compensator 1216. The operational amplifier 1222 outputs a signal a7 according to the current sensing signal a2 and the feedback signal a1, and the OR gate 1224 outputs a signal a4 according to the over current signal a6 and the signal a7. The clock generator 1226 outputs a clock signal a5 to the latch 1228 so that the latch 1228 outputs a signal a3 according to the signal a4 and the clock signal a5. The buffer amplifier 1229 buffers and amplifies the signal a3 into a driving signal DRV and then outputs the driving signal DRV.

The conventional soft start circuit 142(1) converts a reference voltage Vref into a reference voltage Vr and then outputs the reference voltage Vr to the error amplifier 1214, and the conventional soft start circuit 142(1) controls the rising speed of the reference voltage Vr to adjust the duty cycle of the driving signal DRV. However, this system needs the additional soft start circuit to achieve the soft start function.

FIG. 2 (Prior Art) is a schematic illustration showing a second conventional power converter 10(2). Referring to FIG. 2, the difference between the conventional power converter 10(2) and the conventional power converter 10(1) is that the conventional power converter 10(2) provides a signal with a duty cycle, varying from short to long, to the buffer amplifier 1229 so that the duty cycle of the driving signal DRV progressively increases. However, this design has the complicated circuit, and occupies the larger area.

SUMMARY OF THE INVENTION

The invention is directed to an over current protection circuit and a power converter using the same. Because the over current protection circuit of the invention has the soft start function, no additional soft start circuit is required to achieve the soft start function. In addition, the soft start cell of the invention needs not to particularly provide the signal having the duty cycle varying from short to long, so the circuit is simpler and the occupied area is also smaller.

According to a first aspect of the present invention, an over current protection circuit is provided. The over current protection circuit includes a soft start cell and an operational amplifier. The soft start cell outputs a soft start signal according to a direct current (DC) level, wherein the soft start signal increases progressively to the DC level in a soft start interval. The operational amplifier outputs an over current signal to a feedback control circuit according to the soft start signal and an inductance current of a switching converter so that a duty cycle of a driving signal outputted from the feedback control circuit progressively increases in the soft start interval.

According to a second aspect of the present invention, a power converter is provided. The power converter converts first power into second power and outputs the second power to a load. The power converter includes a switching converter, a feedback control circuit, a current sensing circuit and an over current protection circuit. The feedback control circuit outputs a driving signal to drive the switching converter, and the current sensing circuit senses an inductance current of the switching converter to output a current sensing signal. The over current protection circuit includes a soft start cell and an operational amplifier. The soft start cell outputs a soft start signal according to a direct current (DC) level, wherein the soft start signal increases progressively to the DC level in a soft start interval. The operational amplifier outputs an over current signal to the feedback control circuit according to the soft start signal and the inductance current of the switching converter so that a duty cycle of the driving signal outputted from the feedback control circuit progressively increases in the soft start interval.

The invention will become apparent from the following detailed description of the preferred but non-limiting embodiment. The following description is made with reference to the accompanying drawings.

BRIEF DESCRIPTION OF THE DRAWINGS

FIG. 5 shows signal timings for the power converter.

FIG. 6 is a circuit diagram showing a first soft start cell.

FIG. 7 is a circuit diagram showing a second soft start cell.

DETAILED DESCRIPTION OF THE INVENTION

Figure 1:
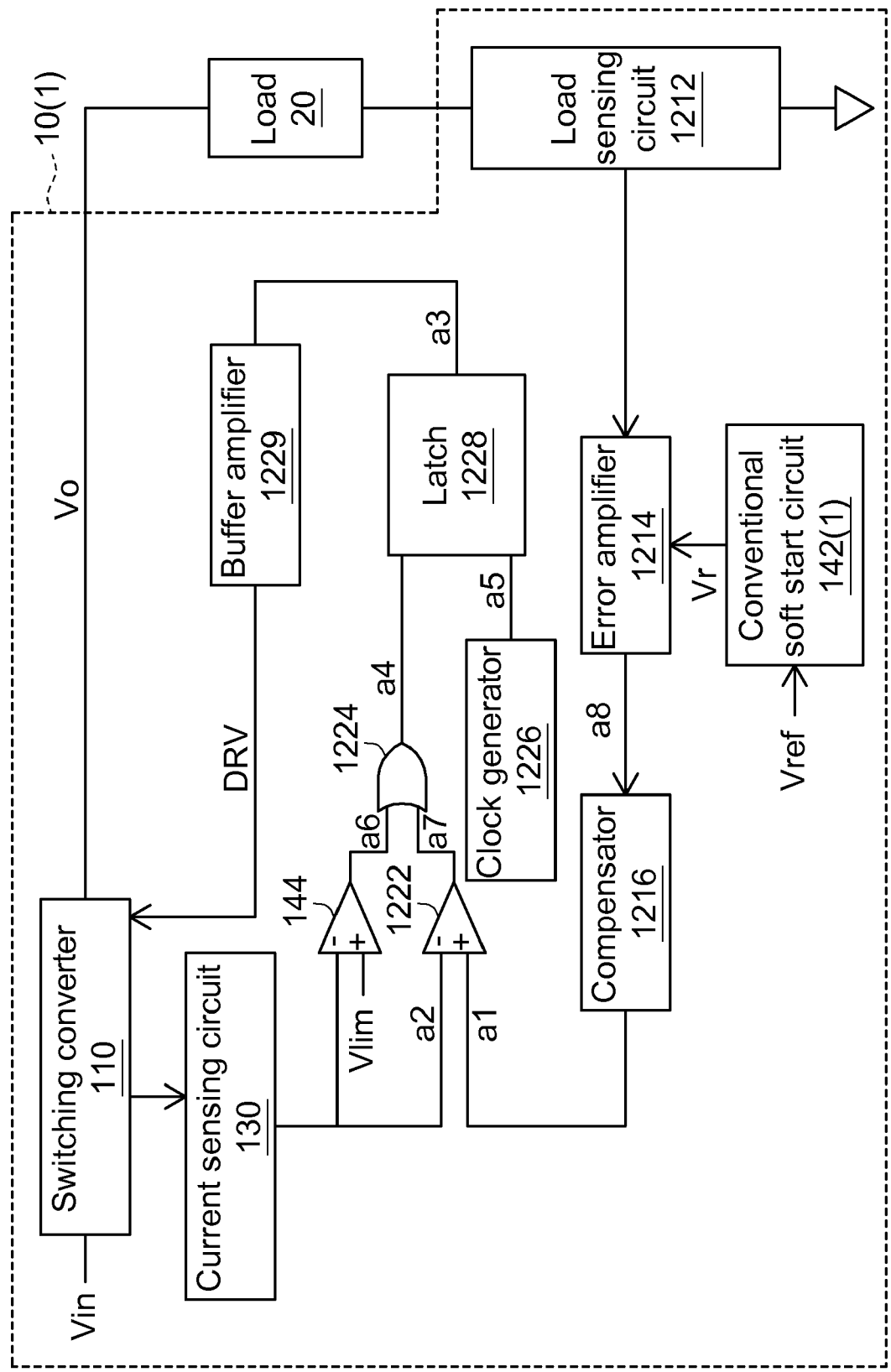
FIG. 1 (Prior Art) is a schematic illustration showing a first conventional power converter.
Figure 2:
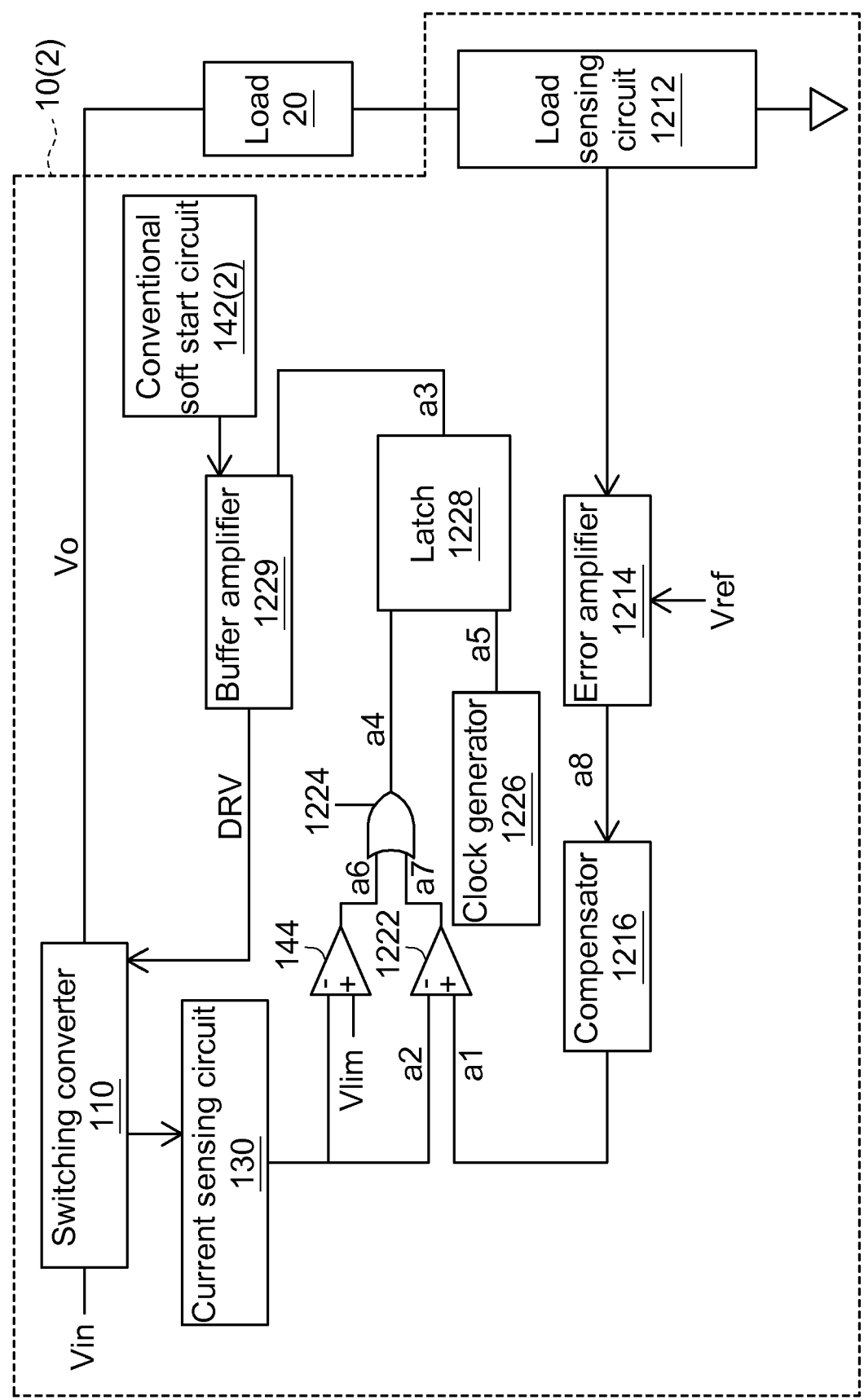
FIG. 2 (Prior Art) is a schematic illustration showing a second conventional power converter.
Figure 3:
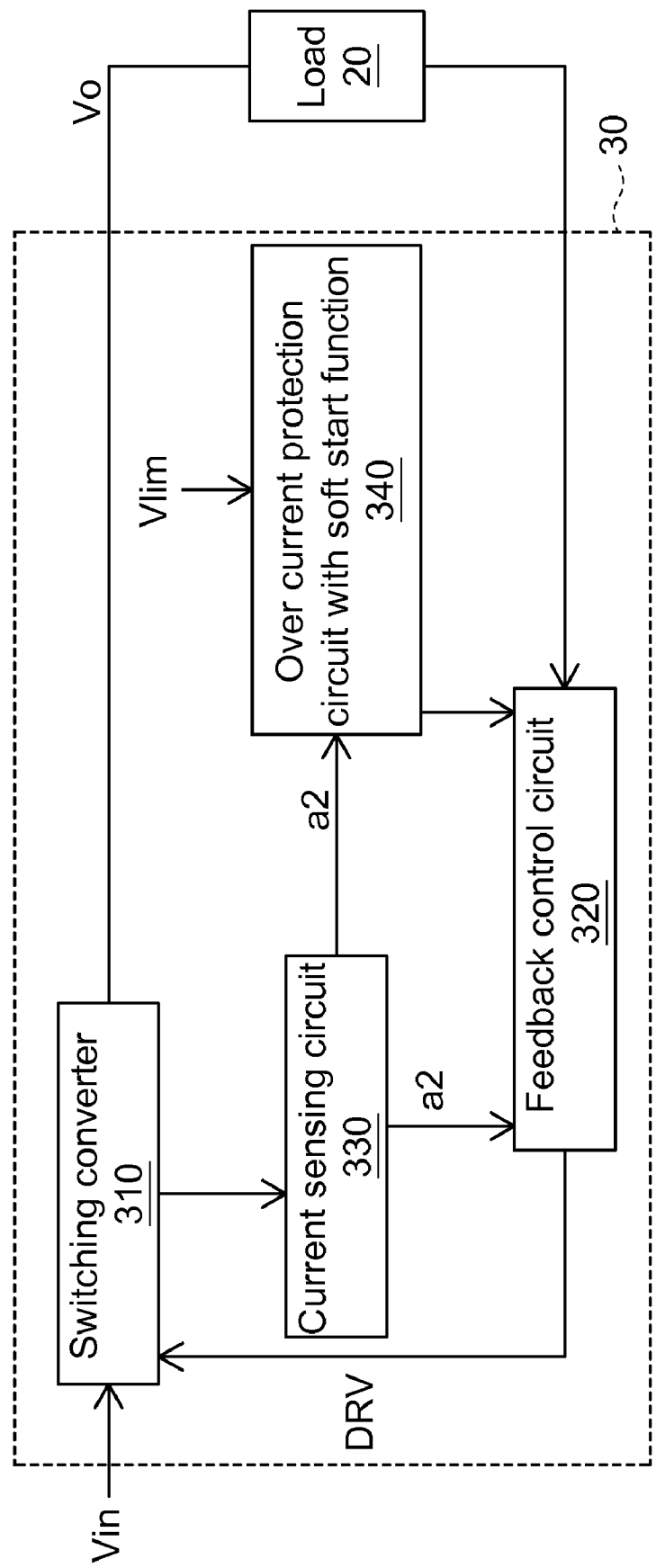
FIG. 3 is a schematic illustration showing a power converter according to a preferred embodiment of the invention.
Figure 4:
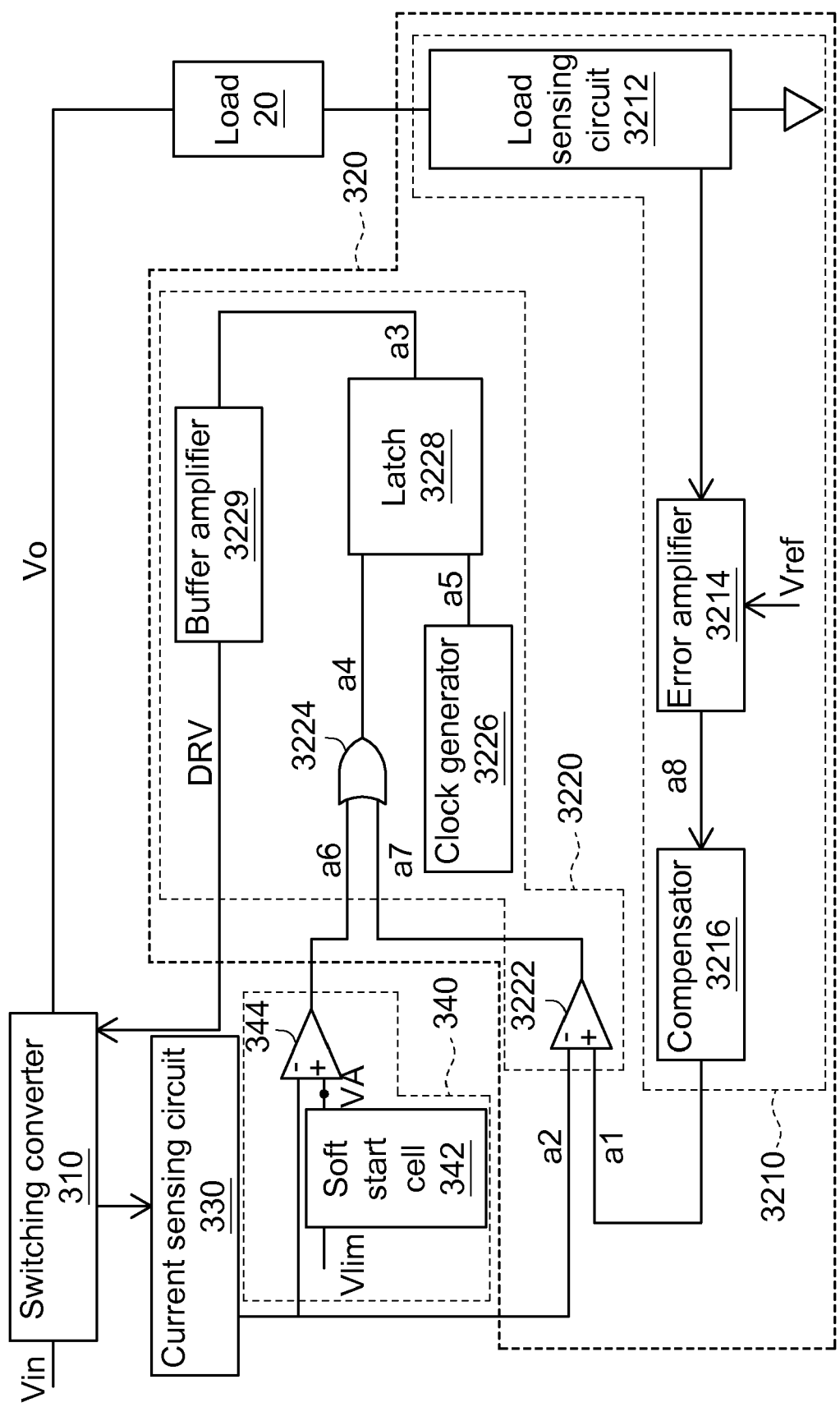
FIG. 4 is a block diagram showing the power converter of FIG. 3.

FIG. 3 is a schematic illustration showing a power converter 30 according to a preferred embodiment of the invention. FIG. 4 is a block diagram showing the power converter 30 of FIG. 3. FIG. 5 shows signal timings for the power converter 30. Referring to FIGS. 3 to 5, the power converter 30 converts power Vin into power Vo and outputs the power Vo to a load 20, wherein the power converter 30 is a current mode or voltage mode power converter, for example. The power converter 30 includes a switching converter 310, a feedback control circuit 320, a current sensing circuit 330 and an over current protection circuit 340 with a soft start function. The feedback control circuit 320 outputs a driving signal DRV to drive the switching converter 310, which may be a boost converter or a buck converter, for example. The current sensing circuit 330 senses an inductance current of the switching converter 310 to output a current sensing signal a2.

The over current protection circuit 340 includes a soft start cell 342 and an operational amplifier 344. The soft start cell 342 outputs a soft start signal VA according to a direct current (DC) level Vlim, wherein the soft start signal VA increases progressively to the DC level Vlim in a soft start interval T1. The operational amplifier 344 outputs an over current signal a6 to the feedback control circuit 320 according to the soft start signal VA and the inductance current of the switching converter 310 so that a duty cycle of the driving signal DRV progressively increases in the soft start interval T1.

The feedback control circuit 320 includes a feedback cell 3210 and a driving cell 3220. The feedback cell 3210 outputs a feedback signal a1 according to a current of the load 20, and the driving cell 3220 outputs the driving signal DRV according to an over current signal VA and the feedback signal a1. When the feedback signal a1 is higher than the soft start signal VA, the duty cycle of the driving signal DRV depends on the soft start signal VA. Oppositely, when the soft start signal VA is higher than the feedback signal a1, the duty cycle of the driving signal DRV depends on the feedback signal a1. In other words, one of the feedback signal a1 and the soft start signal VA, which is lower than the other, dominates over the duty cycle of the driving signal DRV. Because the duty cycle of the driving signal DRV depends on the soft start signal VA and the soft start signal VA progressively increases in the soft start interval T1, the duty cycle of the driving signal DRV progressively increases therewith in the soft start interval T1 to prevent the current from becoming too high.

In detail, the feedback cell 3210 includes a load sensing circuit 3212, an error amplifier 3214 and a compensator 3216. The load sensing circuit 3212 senses the current of the load 20, and outputs the feedback signal a1 via the error amplifier 3214 and the compensator 3216. The driving cell 3220 includes an operational amplifier 3222, a logic gate 3224, a clock generator 3226, a latch 3228 and a buffer amplifier 3229. The operational amplifier 3222 outputs a signal a7 according to the current sensing signal a2 and the feedback signal a1, and an OR gate 3224 outputs a signal a4 according to the over current signal a6 and the signal a7. The clock generator 3226 outputs a clock signal a5 to the latch 3228 so that the latch 3228 outputs a signal a3 according to the signal a4 and the clock signal a5. The buffer amplifier 3229 buffers and amplifies the signal a3, and then outputs the driving signal DRV.

The over current protection circuit 340 has the soft start function. Thus, no additional soft start circuit is needed to achieve the soft start function. In addition, the soft start cell 342 does not need the signal having the duty cycle varying from short to long, so the circuit is simpler and occupies the smaller area.

FIG. 6 is a circuit diagram showing a first soft start cell. FIG. 7 is a circuit diagram showing a second soft start cell. The soft start cell 342 of FIG. 4 is indicated by a soft start cell 342(1) and a soft start cell 342(2) in FIGS. 6 and 7, respectively. The soft start cell 342(1) includes a resistor R and a capacitor C, both of which are connected in series. The resistor R has a first terminal for receiving the DC level Vlim, and a second terminal connected to the capacitor C so that two terminals of the capacitor C output the soft start signal VA.

The soft start cell 342(2) includes a capacitor C and a constant current source 70. The constant current source 70 is provided by, for example, an operational amplifier 710, and the constant current source charges the capacitor C according to the DC level Vlim to output the soft start signal VA.

The over current protection circuit and the power converter using the same according to the embodiment of the invention have the following advantages.

First, the over current protection is combined with the soft start function, and no additional soft start circuit is needed to achieve the soft start function.

Second, the circuit is simpler.

Third, the occupied area is smaller.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An over current protection circuit, comprising:
 a soft start cell for outputting a soft start signal according to a direct current (DC) level, wherein the soft start signal increases progressively to the DC level in a soft start interval; and
 an operational amplifier for outputting an over current signal to a feedback control circuit according to the soft start signal and an inductance current of a switching converter so that a duty cycle of a driving signal outputted from the feedback control circuit progressively increases in the soft start interval.

2. The circuit according to claim 1, wherein the feedback control circuit comprises:
 a feedback cell for outputting a feedback signal according to a current of a load; and
 a driving cell for outputting the driving signal according to the over current signal and the feedback signal.

3. The circuit according to claim 2, wherein when the feedback signal is higher than the soft start signal, the duty cycle of the driving signal depends on the soft start signal.

4. The circuit according to claim 2, wherein when the soft start signal is higher than the feedback signal, the duty cycle of the driving signal depends on the feedback signal.

5. The circuit according to claim 1, wherein the soft start cell comprises:
 a capacitor; and
 a constant current source for charging the capacitor according to the DC level to output the soft start signal.

6. The circuit according to claim 5, wherein the constant current source is provided by another operational amplifier.

7. The circuit according to claim 1, wherein the soft start cell comprises:
 a resistor, which comprises:
  a first terminal for receiving the DC level; and
  a second terminal; and
 a capacitor connected to the second terminal so that two terminals of the capacitor output the soft start signal.

8. A power converter for converting first power into second power and outputting the second power to a load, the power converter comprising:
 a switching converter;
 a feedback control circuit for outputting a driving signal to drive the switching converter;
 a current sensing circuit for sensing an inductance current of the switching converter to output a current sensing signal; and
 an over current protection circuit, which comprises:

a soft start cell for outputting a soft start signal according to a direct current (DC) level, wherein the soft start signal increases progressively to the DC level in a soft start interval; and an operational amplifier for outputting an over current signal to the feedback control circuit according to the soft start signal and the inductance current of the switching converter so that a duty cycle of the driving signal progressively increases in the soft start interval.

9. The power converter according to claim 8, wherein the feedback control circuit comprises:

a feedback cell for outputting a feedback signal according to a current of the load; and a driving cell for outputting the driving signal according to the over current signal and the feedback signal.

10. The power converter according to claim 9, wherein when the feedback signal is higher than the soft start signal, the duty cycle of the driving signal depends on the soft start signal.

11. The power converter according to claim 9, wherein when the soft start signal is higher than the feedback signal, the duty cycle of the driving signal depends on the feedback signal.

12. The power converter according to claim 8, wherein the soft start cell comprises:

a capacitor; and a constant current source for charging the capacitor according to the DC level to output the soft start signal.

13. The power converter according to claim 12, wherein the constant current source is provided by another operational amplifier.

14. The power converter according to claim 8, wherein the soft start cell comprises:

a resistor, which comprises:

a first terminal for receiving the DC level; and a second terminal; and a capacitor connected to the second terminal so that two terminals of the capacitor output the soft start signal.

15. The power converter according to claim 8, wherein the power converter is a current mode power converter.

16. The power converter according to claim 8, wherein the power converter is a voltage mode power converter.

* * * * *